(12) United States Patent
Peng et al.

(10) Patent No.: US 9,800,863 B2
(45) Date of Patent: Oct. 24, 2017

(54) THREE DIMENSIONAL DISPLAY APPARATUS, DISPLAY METHOD AND ELECTRONIC DEVICE

(71) Applicant: LENOVO (BEIJING) CO., LTD., Beijing (CN)

(72) Inventors: Yifan Peng, Beijing (CN); Guang Yang, Beijing (CN); Ke Shang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 399 days.

(21) Appl. No.: 14/231,178

(22) Filed: Mar. 31, 2014

(65) Prior Publication Data
US 2015/0062310 A1 Mar. 5, 2015

(30) Foreign Application Priority Data
Sep. 4, 2013 (CN) .......................... 2013 1 0398095

(51) Int. Cl.
*H04N 13/04* (2006.01)

(52) U.S. Cl.
CPC ..... *H04N 13/0459* (2013.01); *H04N 13/0495* (2013.01)

(58) Field of Classification Search
None
See application file for complete search history.

(56) References Cited

U.S. PATENT DOCUMENTS

| 5,745,197 A | * | 4/1998 | Leung | G02B 27/2278 |
| | | | | 348/E13.02 |
| 6,366,270 B1 | * | 4/2002 | Evanicky | G02B 6/0068 |
| | | | | 345/589 |

(Continued)

FOREIGN PATENT DOCUMENTS

| CN | 101218621 | 7/2008 |
| CN | 102692805 | 9/2012 |

OTHER PUBLICATIONS

Chinese Patent Application CN 201310398095.2, Chinese Patent Office, First Office Action dated Oct. 31, 2016; 12 pages.

(Continued)

*Primary Examiner* — Reza Aghevli
(74) *Attorney, Agent, or Firm* — Dentons US LLP; Peter Su

(57) ABSTRACT

The present disclosure provides an optical-field 3D display apparatus based on multi-layer transparent excitation display, display method thereof, and an electronic device. The 3D display apparatus comprises an array of multiple layers of display units comprising at least two layers of display units, any layer of display unit of the said layers of display units being configured with a transparent fluorescent excitation thin film layer; and an array of excitation projection units comprising at least one excitation projection unit, the light emitted from all the projection units in the array of excitation projection units being projected to corresponding display units in the array of multiple layers of display units to excite the transparent fluorescent excitation thin film layer to display corresponding images, the corresponding images being superimposed for imaging.

12 Claims, 8 Drawing Sheets array of multiple layers of display units 10 array of excitation projection units 20

(56) References Cited

U.S. PATENT DOCUMENTS

| | | | | |
|---|---|---|---|---|
| 6,380,687 | B1* | 4/2002 | Yamazaki | G09G 3/3233 |
| | | | | 315/169.1 |
| 7,221,332 | B2* | 5/2007 | Miller | G02B 27/26 |
| | | | | 345/32 |
| 8,134,544 | B2* | 3/2012 | Fukushima | G02F 1/1335 |
| | | | | 345/204 |
| 8,698,713 | B2* | 4/2014 | Hajjar | G03B 21/567 |
| | | | | 345/32 |
| 2006/0292311 | A1* | 12/2006 | Kilburn | F26B 3/28 |
| | | | | 427/487 |
| 2010/0302349 | A1* | 12/2010 | Huang | H04N 13/0404 |
| | | | | 348/51 |
| 2012/0133606 | A1* | 5/2012 | Artusi | G09G 3/20 |
| | | | | 345/173 |
| 2012/0182334 | A1* | 7/2012 | Ranieri | G02B 27/2214 |
| | | | | 345/694 |
| 2013/0170218 | A1* | 7/2013 | Wolk | G02B 6/0036 |
| | | | | 362/296.01 |
| 2014/0319508 | A1* | 10/2014 | Tanihara | G02B 5/3025 |
| | | | | 257/40 |

OTHER PUBLICATIONS

English Text Translation of First Office Action for Chinese Patent Application CN 201310398095.2, Chinese Patent Office, First Office Action dated Oct. 31, 2016; 13 pages.

English Text Translation of Chinese Patent Application CN 101218621 A, published on Jul. 9, 2008; 85 pages.

Second Office Action issued for Chinese Patent Application CN 201310398095.2, Chinese Patent Office, Second Office Action dated May 8, 2017; 9 pages.

English Text Translation of Second Office Action for Chinese Patent Application CN 201310398095.2, Chinese Patent Office, Second Office Action dated May 8, 2017; 10 pages.

Third Office Action issued for Chinese Patent Application CN 201310398095.2, Chinese Patent Office, Third Office Action dated Aug. 9, 2017; 13 pages.

English Text Translation of Third Office Action for Chinese Patent Application CN 201310398095.2, Chinese Patent Office, Third Office Action dated Aug. 9, 2017; 14 pages.

English Text Translation of Chinese Patent Application 102692805 (A), Univ Zhejiang, dated Sep. 26, 2012; 7 pages.

* cited by examiner

THREE DIMENSIONAL DISPLAY APPARATUS, DISPLAY METHOD AND ELECTRONIC DEVICE

CROSS REFERENCE TO RELATED APPLICATIONS

This application claims the benefit under 35 U.S.C. §119 (a) of Chinese Patent Application No. 201310398095.2, filed on Sep. 4, 2013, the disclosure of which is incorporated by reference herein in its entirety.

TECHNICAL FIELD

The present disclosure relates to the field of three-dimensional (3D) display, and particularly to an optical-field 3D display apparatus based on multi-layer transparent excitation display, display method thereof, and an electronic device.

BACKGROUND

Human beings are natural spatial thinkers, which promotes the display technology to develop toward the direction of 3D full view display of high definition. The display technologies around the world can be generally classified into holographic 3D display and non-holographic 3D display. The holographic 3D display is considered an ideal 3D display method for the future due to its real 3D information recording and displaying; however, in terms of dynamic display, it needs a high-resolution spatial optical modulator and an ultra-high-speed data processing system, which limits the progress of this technology dramatically and prevents it from being put into practical application effectively. Therefore, the non-holographic 3D display is current mainstream display technology. The ways of implementing the non-holographic 3D display are generally classified into volumetric 3D display, integrated imaging 3D display, autostereoscopic 3D display, etc. Good display devices have appeared recently for the volumetric 3D display; however, the display apparatus based on such a method mostly meets the need of full view watching by rotating the screen, so the structure of the display apparatus is relatively complicated and the cost thereof is relatively expensive. For the conventional integrated imaging 3D display technology, many problems, such as number of angles of view, image crosstalk, depth, and size of a display area, etc., need to be solved. Ultimately, one big problem in the naked eye 3D display is the limited amount of information. Therefore, how to integrate the advantages of existing hardware resources to expand the amount of information becomes a research direction in the industry.

One approach for realizing spatial 3D display is to use a structure of superimposing multiple layers of display devices, modulation of spatial light and superimposition of the amount of information. Some research sources around the world have reported a scheme of realizing optical-field 3D display by using a multi-player liquid crystal panel. Compared with conventional large 3D display devices, the 3D display solution of the multi-layer panel is cheap in the cost of the engineering implementation and relatively simple in hardware structure. The principle and algorithm of the optical-field 3D display have been researched to some extent in the industry, which is referred to herein. However, the existing multi-layer display solutions mostly have problems such as limited resolution, limited angle of view, etc. In addition, the desire of people on 3D display consists more in real and visional effect and weakening the virtual existence of the display device.

Transparent display has been a research hot point for a long time, and the academic world has invented some technologies with potential for market applications. The transparent display technology based on fluorescent excitation has been developed well recently. The transparent material containing fluorescence excitation particles can be used to manufacture a thin film as a spatial medium, and visible light in a certain band is generated by excitation with the corresponding ultraviolet light or blue light. The technology of such fluorescent excitation light-emitting has been proved in principle. The materials for fluorescent excitation can refer to, for example, US6986581B2 and US7090355B2. There is a wide market potential to construct a new transparent 3D display mode by applying the above technology to the field of personal display devices in consideration of the need of the market on the 3D display.

In view of the above, an object of the present disclosure is to provide an optical-field 3D display apparatus, method and electronic device based on multi-layer transparent excitation display, which integrate the multi-layer display technology and the transparent excitation display technology, and can realize display image reproducing with various projection modes such as back projection, front projection, side projection, etc., having large application value and being able to be widely used in the fields of public entertainment, military sand-table exercises, medical simulation, public presentation, etc.

SUMMARY

In view of the above, the present disclosure provides an optical-field 3D display apparatus, method, and electronic device based on multi-layer transparent excitation display.

According to one embodiment of the present disclosure, there is provided a 3D display apparatus, comprising an array of multiple layers of display units comprising at least two layers of display units, any layer of display unit of the said layers of display units being configured with a transparent fluorescent excitation thin film layer; and an array of excitation projection units comprising at least one excitation projection unit, the light emitted from all the projection units in the array of excitation projection units being projected to corresponding display units in the array of multiple layers of display units to excite the transparent fluorescent excitation thin film layer to display corresponding images, the corresponding images being superimposed for imaging.

Further, in the 3D display apparatus according to one embodiment of the present disclosure, any layer of display unit of the array of multiple layers of display units further comprising a transparent substrate layer and a stray light absorption thin film layer, and the transparent substrate layer, the transparent fluorescent excitation thin film layer, the stray light absorption thin film layer are arranged in sequence.

Further, in the 3D display apparatus according to one embodiment of the present disclosure, the transparent fluorescent excitation thin film layer is a transparent thin film layer containing fluorescent excitation material, and the fluorescent excitation material excites, by a light in a specific band, a visible light in a corresponding band.

Further, in the 3D display apparatus according to one embodiment of the present disclosure, the array of excitation projection units comprises a single excitation projection unit, and the single excitation projection unit emits light with the same wavelength in time sequence to be projected to each layer of display unit in the array of multiple layers of display units, or the single excitation projection unit emits light with different wavelengths simultaneously to be projected to each layer of display unit in the array of multiple layers of display units.

Further, in the 3D display apparatus according to one embodiment of the present disclosure, the array of excitation projection units comprises multiple excitation projection units, and each of the multiple excitation projection units emits light with the same wavelength or a different wavelength to be projected to the corresponding display unit in the array of multiple layers of display units.

Further, in the 3D display apparatus according to one embodiment of the present disclosure, the stray light absorption thin film layer is a thin film layer, which absorbs an excitation light source with a specific wavelength but transmits visible light with a specific wavelength.

Further, in the 3D display apparatus according to one embodiment of the present disclosure, the light emitted from all the projection units in the array of excitation projection units being projected to corresponding display units in the array of multiple layers of display units comprises direct back projection, direct front projection or side projection by a corresponding reflective light path.

According to another embodiment of the present disclosure, there is provided a 3D display method for a 3D display apparatus, the 3D display apparatus comprising an array of multiple layers of display units comprising at least two layers of display units and an array of excitation projection units comprising at least one excitation projection unit, any layer of display unit of the said layers of display units being configured with a transparent fluorescent excitation thin film layer, the light emitted from all the projection units in the array of excitation projection units being projected to corresponding display units in the array of multiple layers of display units, the display method comprising determining the imaging position in space of a 3D scene to be displayed; determining display pixel information corresponding to each layer of display unit based on the imaging position in space of the 3D scene and a watching viewpoint position; combining the display pixel information into display images to be transferred to corresponding excitation projection units respectively as image sources of projection display; and projecting by the excitation projection units in the array of excitation projection units the image sources to corresponding display units in the array of multiple layers of display units to excite corresponding transparent fluorescent excitation thin film layers to display images, and superimposing multiple layers of images.

Further, in the 3D display method according to another embodiment of the present disclosure, determining display pixel information corresponding to each layer of display unit based on the imaging position in space of the 3D scene and a watching viewpoint position comprises performing 3D stereoscopic spatial description on the displayed 3D scene; tracing a light path from a watching viewpoint through the imaging position of the 3D scene to each layer of display unit to determine corresponding pixel information required to be displayed by each layer of display unit; and traversing all watching viewpoint positions to complete light path tracing to compute all pixel information of each layer of display unit.

Further, in the 3D display method according to another embodiment of the present disclosure, the array of excitation projection units comprises a single excitation projection unit, and projecting by the excitation projection units in the array of excitation projection units the image sources to corresponding display units in the array of multiple layers of display units comprises emitting by the single excitation projection unit light with the same wavelength in time sequence to be projected to each layer display unit in the array of multiple layers of display units, or emitting by the single excitation projection unit light with different wavelengths simultaneously to be projected to each layer of display unit in the array of multiple layers of display units.

Further, in the 3D display method according to another embodiment of the present disclosure, the array of excitation projection units comprises multiple excitation projection units, and projecting by the excitation projection units in the array of excitation projection units the image sources to corresponding display units in the array of multiple layers of display units comprises emitting by each of the multiple excitation projection units light with the same wavelength or a different wavelength to be projected to the corresponding display unit in the array of multiple layers of display units.

According to yet another embodiment of the present disclosure, there is provided an electronic device comprising a display unit configured to perform image display; and a processing unit configured to generate display pixel information based on images to be displayed and control the display unit to perform corresponding display, wherein the display unit comprises an array of multiple layers of display units comprising at least two layers of display units, any layer of display unit of the said layers of display units being configured with a transparent fluorescent excitation thin film layer; and an array of excitation projection units comprising at least one excitation projection unit, all the projection units in the array of excitation projection units emitting, based on the display pixel information received from the processing unit, light to be projected to corresponding display units in the array of multiple layers of display units to excite the transparent fluorescent excitation thin film layer to display corresponding images, the corresponding images being superimposed for imaging.

Further, in the electronic device according to yet another embodiment of the present disclosure, the processing unit determines the imaging position in space of a 3D scene to be displayed, determines display pixel information corresponding to each layer of display unit based on the imaging position in space of the 3D scene and a watching viewpoint position, and combines the display pixel information into display images to be transferred to corresponding excitation projection units respectively as image sources of projection display.

The 3D display apparatus, the display method and the electronic device according to embodiments of the present disclosure integrate the multi-layer display technology using the superimposition of multiple layers of display devices and the transparent excitation display technology based on fluorescent excitation, and can realize display image reproducing with various projection modes such as back projection, front projection, side projection, etc., so as to realize transparent 3D display with a low cost and a simple hardware structure.

DETAILED DESCRIPTION

In the following, several embodiments, applications, and modifications will be described in detail with reference to the accompanying drawings. In addition, the embodiments described in the following are preferred specific examples and various preferred limitations in technology are set therein. However, in the following description, the present disclosure is not limited to those embodiments.

First, a display apparatus according to an embodiment of the present disclosure will be described with reference to FIG. 1. The display apparatus is a 3D display apparatus, which can be applied to the fields of public entertainment, military sand-table exercise, medical simulation, public presentation, etc. The 3D display apparatus integrates the multi-layer display technology using the superimposition of multiple layers of display devices and the transparent excitation display technology based on fluorescent excitation.

Figure 1:
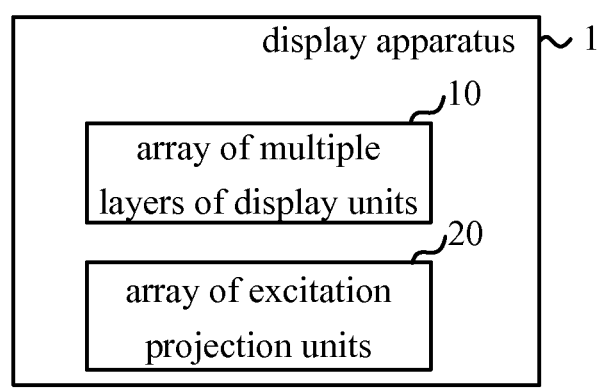
FIG. 1 is a functional block diagram illustrating a display apparatus according to an embodiment of the present disclosure.

FIG. 1 is a functional block diagram illustrating the display apparatus according to an embodiment of the present disclosure. As shown in FIG. 1, the display apparatus 1 according to the embodiment of the present disclosure includes an array of multiple layers of display units 10 and an array of excitation projection units 20.

In particular, the array of multiple layers of display units 10 includes at least two layers of display units. Any layer of display unit of the said layers of display units is configured with a transparent fluorescent excitation thin film layer. The transparent fluorescent excitation thin film layer is a transparent thin film layer containing fluorescent excitation material, and the fluorescent excitation material excites by a light in a specific band a visible light in a corresponding band. For example, with the projection excitation of a blue light source or an ultraviolet source, a colorful fluorescent pattern is presented on the transparent surface of the layer of display unit.

The array of excitation projection units 20 includes at least one excitation projection unit. The light emitted from all the projection units in the array of excitation projection units is projected to corresponding display units in the array of multiple layers of display units to excite the transparent fluorescent excitation thin film layer to display corresponding images. The 3D display imaged by superimposing can be obtained by superimposing corresponding images displayed by each layer of display unit in the array of multiple layers of display units.

In the following, the structure and the light path of the display apparatus according to an embodiment of the present disclosure will be further described in detail with reference to FIG. 2A and FIG. 2B.

Figure 2A:
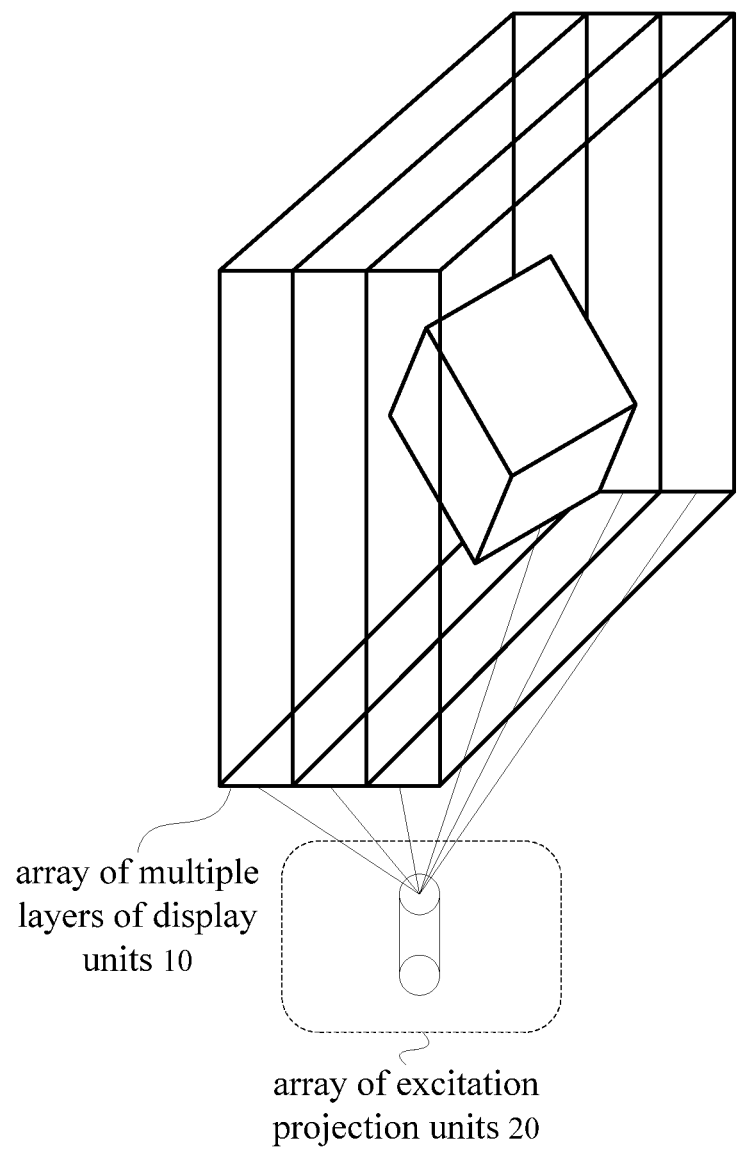
FIG. 2A and FIG. 2B are schematic diagrams illustrating the structure and the optical path of the display apparatus according to embodiments of the present disclosure.
Figure 2B:
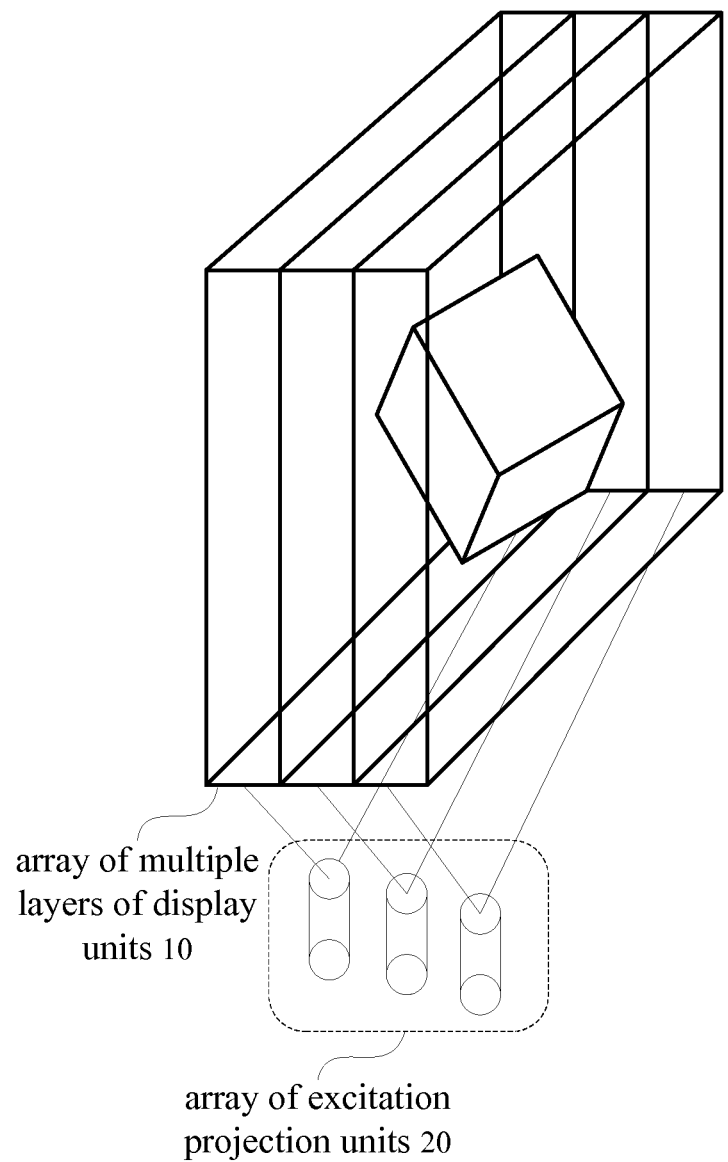

FIG. 2A and FIG. 2B are schematic diagrams illustrating the structure and the light path of the display apparatus according to embodiments of the present disclosure. As shown in FIG. 2A, the array of multiple layers of display units 10 includes three layers of display units. It can be easily understood by those skilled in the art that the case shown in FIG. 2A is only exemplary, and the array of multiple layers of display units 10 is not limited to having only three layers of display units. In general, the more layers of display units are included in the array of multiple layers of display units 10, the better the image quality of the 3D image obtained by superimposing the display image of each layer is. However, with the increase of the number of layers of display units, the workload for design and process of the corresponding projection unit increases. Therefore, depending on the application scenario and design requirement, tradeoff should be placed between cost and 3D display effect.

In addition, as shown in FIG. 2A, the array of excitation projection units 20 includes a single excitation projection unit. It can be easily understood by those skilled in the art that the array of excitation projection units 20 can include more than one excitation projection unit, which will be described with reference to FIG. 2B in the following.

In the configuration shown in FIG. 2A, the array of excitation projection units 20 can adopt two different projection modes. In the first projection mode, the single excitation projection unit emits light with the same wavelength in time sequence to be projected to each layer of display unit in the array of multiple layers of display units, so as to excite each layer of display unit in the array of multiple layers of display units 10 to emit light in sequence. In the second projection mode, the single excitation projection unit emits light with different wavelengths simultaneously to be projected to each layer of display unit in the array of multiple layers of display units. Each layer of display unit in the array of multiple layers of display units 10 only emits light in response to the wavelength corresponding to the transparent fluorescent excitation thin film layer of itself.

Different from the configuration shown in FIG. 2A, as shown in FIG. 2B, the array of excitation projection units 20 includes three excitation projection units. It can be easily understood by those skilled in the art that the case shown in FIG. 2B is only exemplary, and the array of excitation projection units 20 is not limited to having only three excitation projection units. In the configuration shown in FIG. 2B, each of the excitation projection units in the array of excitation projection units 20 is corresponding to each layer of display unit in the array of multiple layers of display units 10 respectively so that each of the multiple excitation projection units emits light with the same wavelength or a different wavelength to be projected to the corresponding display unit in the array of multiple layers of display units 10 so as to excite the corresponding display unit in the array of multiple layers of display units 10 to emit light.

Figure 3:
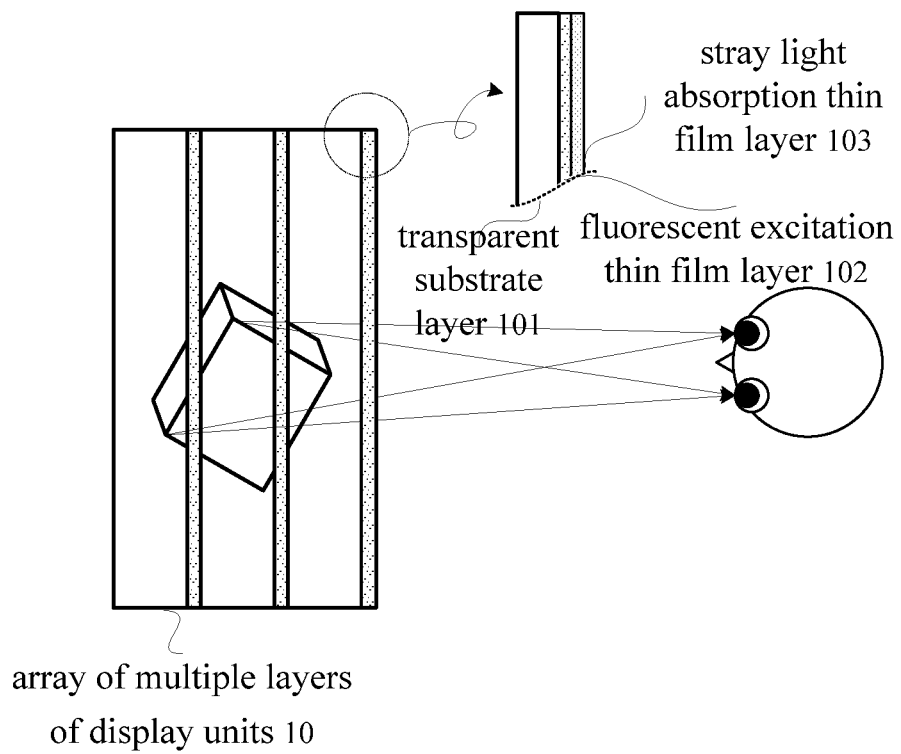
FIG. 3 is a schematic diagram further illustrating the structure and the optical path of the array of multiple layers of display units in the display apparatus according to an embodiment of the present disclosure.

FIG. 3 is a schematic diagram further illustrating the structure and the optical path of the array of multiple layers of display units in the display apparatus according to an embodiment of the present disclosure.

As shown in FIG. 3, in particular, each layer of display unit in the array of multiple layers of display units 10 includes a transparent substrate layer 101, a fluorescent excitation thin film layer 102, and a stray light absorption thin film layer 103.

As shown in the above, the fluorescent excitation thin film layer 102 is a transparent thin film layer containing fluorescent excitation material, and the fluorescent excitation material excites by a light in a specific band a visible light in a corresponding band. The stray light absorption thin film layer 103 is a thin film layer, which absorbs an excitation light source with a specific wavelength but transmits visible light with a specific wavelength. The fluorescent material for fabricating the fluorescent excitation thin film layer 102 can be inorganic fluorescent material or organic fluorescent material. The representative inorganic fluorescent material is rare earth ion light-emitting or rare earth fluorescent material, which includes, but is not limited to, having alkaline earth metal sulfides (such as ZnS, CaS), aluminate (SrAl2O4, CaAl2O4, BaAl2O4) or the like as a light emitting substrate, having rare earth lanthanide element [europium (Eu), samarium (Sm), erbium (Er), neodymium (Nd), etc.] as an activator and a co-activator. The fabrication method for the inorganic fluorescence excitation thin film layer includes, but is not limited to, high-temperature solid-phase method, combustion method, sol-gel method, hydrothermal precipitation method, microwave method, etc. Organic fluorescent materials include organic small molecule fluorescent material and organic macromolecule fluorescent material. Organic small molecule fluorescent materials include, but are not limited to, oxadiazole and its derivatives, triazole and its derivatives, rhodamine and its derivatives, coumarin derivatives, 1,8-naphthalimide derivatives, pyrazoline derivatives, triphenyl amine derivatives, porphyrin-based compounds, carbazole, pyrazine, thiazole derivatives, perylene derivatives, etc. Organic macromolecule fluorescent materials include, but are not limited to, polyphenyl, polythiophene, polyfluorene, poly-triphenylamine and derivatives thereof, polycarbazole, polypyrrole, porphyrin and derivatives, copolymers thereof, etc.

As shown in FIG. 3, each layer of display unit of the array of multiple layers of display units 10 displays the foreground and the background of the stereoscopic image respectively, so as to produce the impression of depth between the front and the back when a user watches after the display images of each layer of display unit are superimposed. In addition, in order to further enhance the stereoscopic feeling of the images displayed by each layer of display unit, a modulation device such as a parallax barrier grating or a cylindrical lens can be further configured in each layer of display unit to further increase the parallax of the display images respectively entering the left eye and the right eye of the user to enhance the stereoscopic feeling.

In the above, the structure and the light path of the display apparatus according to embodiments of the present disclosure are described with reference to FIG. 2A, FIG. 2B and FIG. 3. In the following, the projection modes adopted by the display apparatus according to an embodiment of the present disclosure will be further described with reference to FIG. 4A to FIG. 4C.

Figure 4A:
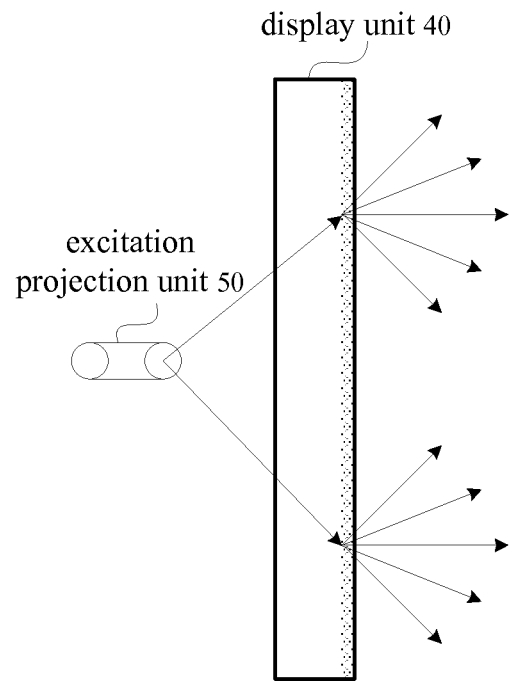
FIG. 4A to FIG. 4C are schematic diagrams illustrating projection modes used in the display apparatus according to embodiments of the present disclosure.
Figure 4B:
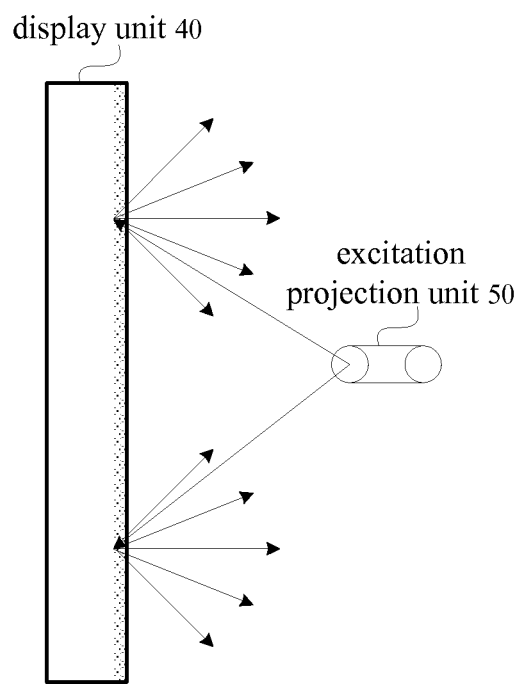
Figure 4C:
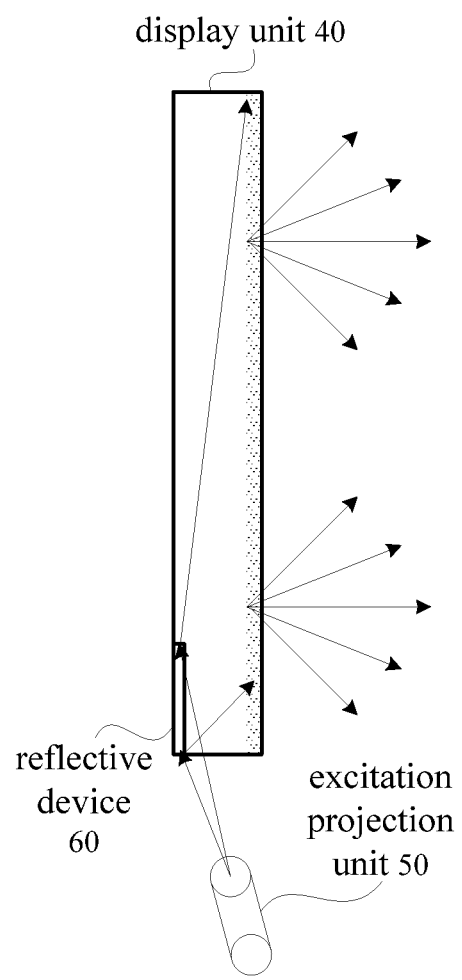

FIG. 4A to FIG. 4C are schematic diagrams illustrating projection modes used in the display apparatus according to embodiments of the present disclosure. The projection of the light emitted from all the projection units in the array of excitation projection units 20 being projected to corresponding display units in the array of multiple layers of display units 10 includes direct back projection, direct front projection or side projection by a corresponding reflective light path.

In FIG. 4A to FIG. 4C, for easy understanding, only a single display unit 40 in the array of multiple layers of display units 10 and a single excitation projection unit 50 in the array of excitation projection units 20 are shown.

FIG. 4A is a schematic diagram illustrating direct back projection. As shown in FIG. 4A, the light emitted from the excitation projection unit 50 is projected to the display unit 40 from the back. The projected excitation light passes through the transparent substrate layer 101 to make the fluorescent excitation thin film layer 102 emit light, and the stray light absorption thin film layer 103 transmits the fluorescence emitted from the fluorescent excitation thin film layer 102 but absorbs the stray light of other wavelengths.

FIG. 4B is a schematic diagram illustrating direct front projection. Different from the direct back projection shown in FIG. 4A, as shown in FIG. 4B, the light emitted from the excitation projection unit 50 is projected to the display unit 40 from the front. Similar to the case shown in FIG. 4A, the projected excitation light passes through the transparent substrate layer 101 to make the fluorescent excitation thin film layer 102 emit light, and the stray light absorption thin film layer 103 transmits the fluorescence emitted from the fluorescent excitation thin film layer 102 but absorbs the stray light of other wavelengths.

FIG. 4C is a schematic diagram illustrating side projection. Different from the direct projection shown in FIG. 4A and FIG. 4B, as shown in FIG. 4C, the excitation projection unit 50 is arranged on the side of the display unit 40, and the display unit 40 is further configured with a reflective device 60. The light emitted from the excitation projection unit 50 is projected to the reflective device 60 from the side by which the projected excitation light is reflected to the transparent substrate layer 101. Thereby, the reflected excitation light passes through the transparent substrate layer 101 to make the fluorescent excitation thin film layer 102 emit light, and the stray light absorption thin film layer 103 transmits the fluorescence emitted from the fluorescent excitation thin film layer 102 but absorbs the stray light of other wavelengths.

As described in the above, the display apparatus according to an embodiment of the present disclosure can adopt different projection modes depending on the design requirement of different application scenarios.

In the above, the display apparatus according to embodiments of the present disclosure is described with reference to FIG. 1 to FIG. 4. In the following, a display method according to an embodiment of the present disclosure will be described with reference to FIG. 5 and FIG. 6.

Figure 5:
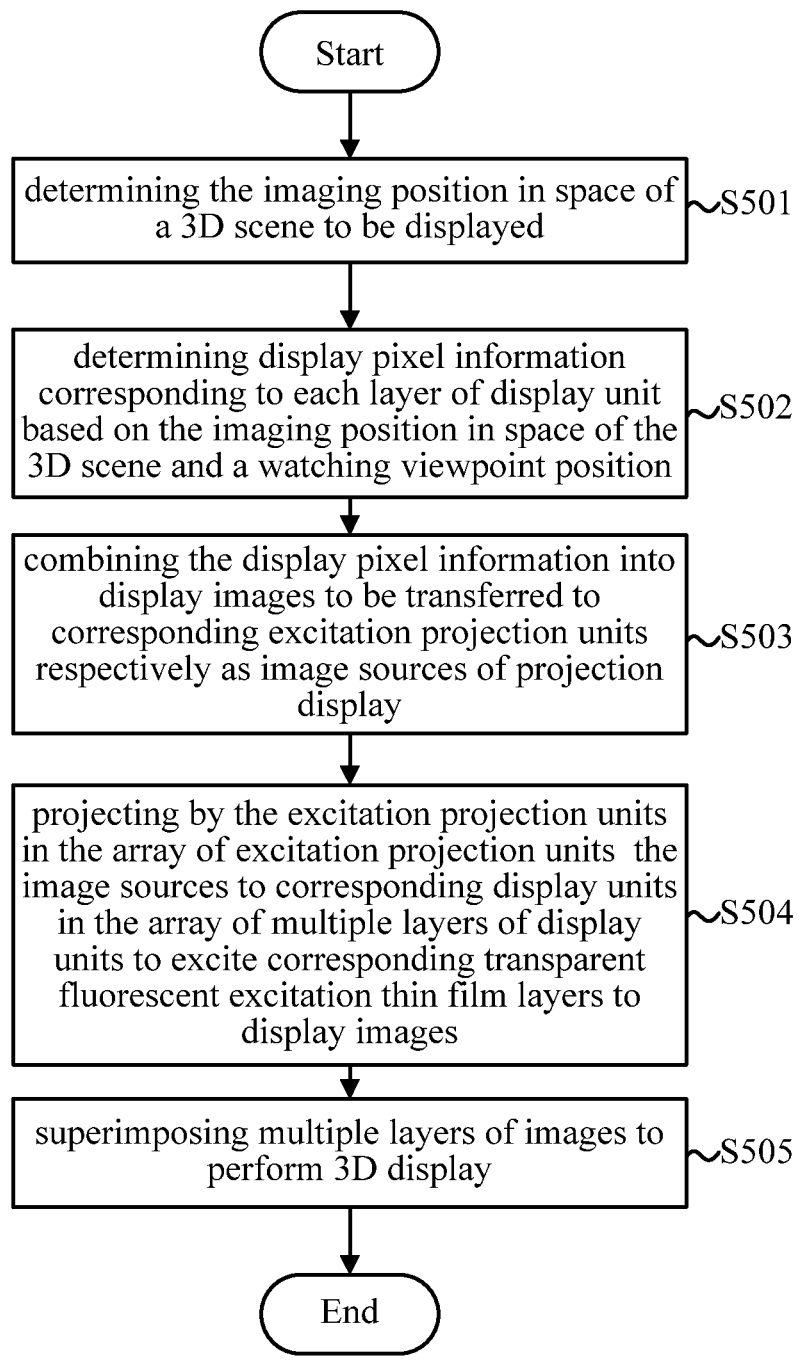
FIG. 5 is a flowchart illustrating a display method according to an embodiment of the present disclosure.

FIG. 5 is a flowchart illustrating a display method according to an embodiment of the present disclosure. As shown in FIG. 5, the display method according to an embodiment of the present disclosure includes steps as follows.

At step S501, the imaging position in space of a 3D scene to be displayed is determined. Next, the method proceeds into step S502.

At step S502, display pixel information corresponding to each layer of display unit is determined based on the imaging position in space of the 3D scene and a watching viewpoint position. Next, the method proceeds into step S503.

At step S503, the display pixel information is combined into display images to be transferred to corresponding excitation projection units respectively as image sources of projection display. Next, the method proceeds into step S504.

At step S504, the excitation projection units in the array of excitation projection units project the image sources to corresponding display units in the array of multiple layers of display units to excite corresponding transparent fluorescent excitation thin film layers to display images. In particular, as described with reference to FIG. 2A and FIG. 2B above, when the array of excitation projection units includes a single excitation projection unit, the excitation projection units in the array of excitation projection units projecting the image sources to corresponding display units in the array of multiple layers of display units includes the single excitation projection unit emitting light with the same wavelength in time sequence to be projected to each layer of display unit in the array of multiple layers of display units, or the single excitation projection unit emitting light with different wavelengths simultaneously to be projected to each layer of display unit in the array of multiple layers of display units. When the array of excitation projection units includes multiple excitation projection units, the excitation projection units in the array of excitation projection units projecting the image sources to corresponding display units in the array of multiple layers of display units includes each of the multiple excitation projection units emitting light with the same wavelength or a different wavelength to be projected to the corresponding display unit in the array of multiple layers of display units. Next, the method proceeds into step S505.

At step S505, the display images of each layer of display unit in the array of multiple layers of display units are superimposed to perform 3D display.

Figure 6:
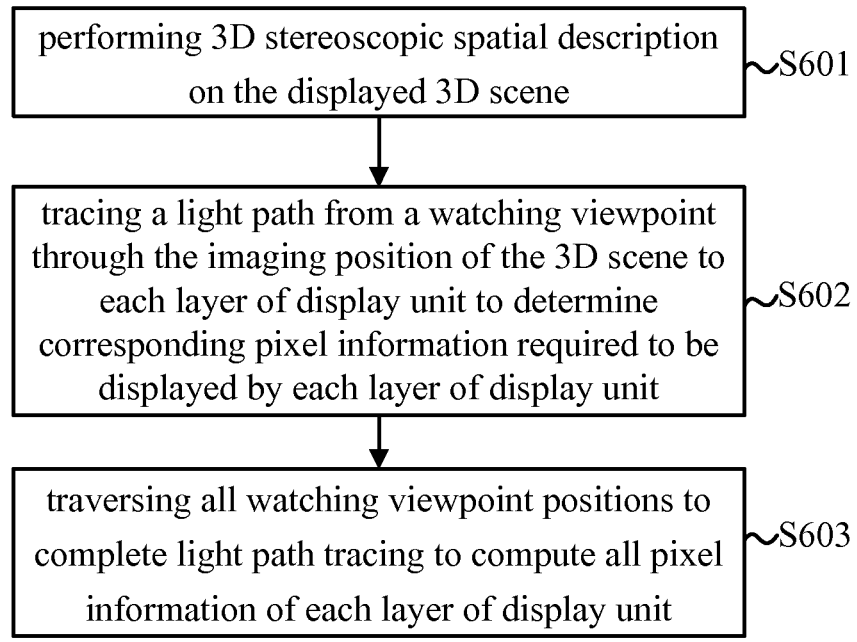
FIG. 6 is a flowchart further illustrating the processing of determining pixel information in the display method according to an embodiment of the present disclosure.

More specifically, FIG. 6 is a flowchart further illustrating the processing of determining pixel information in the display method according to an embodiment of the present disclosure. As shown in FIG. 6, the processing of determining pixel information includes steps as follows.

At step S601, 3D stereoscopic spatial description is performed on the displayed 3D scene. Next, the method proceeds into step S602.

At step S602, a light path is traced from a watching viewpoint through the imaging position of the 3D scene to each layer of display unit to determine corresponding pixel information required to be displayed by each layer of display unit. Next, the method proceeds into step S603.

At step S603, all watching viewpoint positions are traversed to complete light path tracing to compute all pixel information of each layer of display unit.

In the following, an electronic device configured with the display apparatus and using the above display method according to embodiments of the present disclosure will be further described with reference to FIG. 7.

Figure 7:
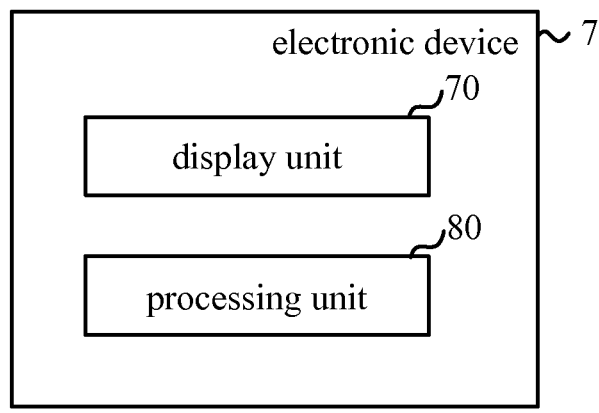
FIG. 7 is a functional block diagram illustrating an electronic device according to an embodiment of the present disclosure.

FIG. 7 is a functional block diagram illustrating an electronic device according to an embodiment of the present disclosure. As shown in FIG. 7, the electronic device 7 according to an embodiment of the present disclosure includes a display unit 70 and a processing unit 80. The display unit 70 is configured to perform image displaying. The processing unit 80 is configured to generate display pixel information based on images to be displayed and control the display unit to perform corresponding display.

In a preferable embodiment of the present disclosure, the display unit 70 is the display unit described with reference to FIG. 1 to FIG. 4, which includes an array of multiple layers of display units including at least two layers of display units, any layer of display unit of the said layers of display units being configured with a transparent fluorescent excitation thin film layer; and an array of excitation projection units including at least one excitation projection unit, wherein all the projection units in the array of excitation projection units emit, based on the display pixel information received from the processing unit, light to be projected to corresponding display units in the array of multiple layers of display units to excite the transparent fluorescent excitation thin film layer to display corresponding images, and the corresponding images are superimposed for imaging. The processing unit 80 determines the imaging position in space of a 3D scene to be displayed, determines display pixel information corresponding to each layer of display unit based on the imaging position in space of the 3D scene and a watching viewpoint position, and combines the display pixel information into display images to be transferred to corresponding excitation projection units respectively as image sources of projection display.

The 3D display apparatus, the display method and the electronic device according to embodiments of the present disclosure are described with reference to FIG. 1 to FIG. 7 in the above, which integrate the multi-layer display technology using the superimposition of multiple layers of display devices and the transparent excitation display technology based on fluorescent excitation, and can realize display image reproducing with various projection modes such as back projection, front projection, side projection, etc., so as to realize transparent 3D display with a low cost and a simple hardware structure.

It is noted that, in the specification, the term of "comprise", "include" or any other variant is intended to cover nonexclusive inclusion, such that a process, method, article or device including a series of elements not only includes those elements but may also include other elements which are not explicitly listed, or may also include native elements of such a process, method, article or device. Without more limitations, an element defined by the sentence "including one . . . " does not exclude the existence of other identical elements in the process, method, article or device including the element.

Finally, it is noted that the above series of processes not only include the processes performed in time sequence described herein, but also include the processes performed in parallel or respectively rather than in time sequence.

With the description of the above implementations, those skilled in the art can clearly understand that the present disclosure can be realized by software in combination with necessary hardware platforms, or entirely by hardware. Based on such understanding, all or part of the contributions of the solutions of the present disclosure to the prior art can be embodied in the form of software product. The computer software product can be stored in a storage medium such as ROM/RAM, magnetic disk, optical disk, etc., and include instructions for causing one computer device (which can be a personal computer, a server, a network device or the like) to implement the methods described in each embodiment or some parts thereof.

The present disclosure has been described in detail in the above. In the specification, specific examples are employed to explain the principle and embodiments of the present disclosure, and the descriptions of the above embodiments are only to facilitate understanding of the methods and core concepts of the present disclosure. In addition, those skilled in the art would make correct in terms of the specific embodiments and the application ranges according to the concepts of the present disclosure. In conclusion, the content of the specification should not be considered as limiting the present disclosure.

What is claimed is:

1. A three-dimensional display apparatus, comprising:
   an array of a plurality of layers of display units comprising at least two layers of display units, any layer of display unit of the at least two layers of display units being configured with a transparent fluorescent excitation thin film layer; and
   an array of excitation projection units comprising at least one excitation projection unit, the light emitted from all the projection units in the array of excitation projection units being projected to corresponding display units in the array of the plurality of layers of display units based on display pixel information to excite the transparent fluorescent excitation thin film layer to display corresponding images, the corresponding images being superimposed for imaging, wherein the display pixel information corresponding to each layer of display unit is determined based on an imaging position in space of a three-dimensional scene to be displayed and a watching viewpoint position, and the display pixel information is combined into display images to be transferred to corresponding excitation projection units respectively as image sources of projection display.

2. The three-dimensional display apparatus of claim 1, wherein any layer of display unit of the array of the plurality of layers of display units further comprising a transparent substrate layer and a stray light absorption thin film layer, and the transparent substrate layer, the transparent fluorescent excitation thin film layer, the stray light absorption thin film layer are arranged in sequence.

3. The apparatus of claim 1, wherein the transparent fluorescent excitation thin film layer is a transparent thin film layer containing fluorescent excitation material, and the fluorescent excitation material is excited by a light in a specific band to emit a visible light in a corresponding band.

4. The apparatus of claim 1, wherein the array of excitation projection units comprises a single excitation projection unit, and the single excitation projection unit emits light with a same wavelength in time sequence to be projected to each layer of display unit in the array of the plurality of layers of display units, or the single excitation projection unit emits light with different wavelengths simultaneously to be projected to each layer of display unit in the array of the plurality of layers of display units.

5. The apparatus of claim 1, wherein the array of excitation projection units comprises a plurality of excitation projection units, and each of the plurality of excitation projection units emits light with a same wavelength or a different wavelength to be projected to a corresponding display unit in the array of the plurality of layers of display units.

6. The apparatus of claim 2, wherein the stray light absorption thin film layer is a thin film layer which absorbs an excitation light source with a specific wavelength but transmits visible light with a specific wavelength.

7. The apparatus of claim 1, wherein the light emitted from all the projection units in the array of excitation projection units being projected to corresponding display units in the array of the plurality of layers of display units comprises direct back projection, direct front projection or side projection by a corresponding reflective light path.

8. A three-dimensional display method for a three-dimensional display apparatus, the three-dimensional display apparatus comprising an array of a plurality of layers of display units comprising at least two layers of display units and an array of excitation projection units comprising at least one excitation projection unit, any layer of display unit of the at least two layers of display units being configured with a transparent fluorescent excitation thin film layer, the light emitted from all the projection units in the array of excitation projection units being projected to corresponding display units in the array of the plurality of layers of display units, the display method comprising:

determining the imaging position in space of a three-dimensional scene to be displayed;

determining display pixel information corresponding to each layer of display unit based on the imaging position in space of the three-dimensional scene and a watching viewpoint position;

combining the display pixel information into display images to be transferred to corresponding excitation projection units respectively as image sources of projection display; and projecting by the excitation projection units in the array of excitation projection units the image sources to corresponding display units in the array of the plurality of layers of display units to excite corresponding transparent fluorescent excitation thin film layers to display images, and superimposing a plurality of layers of images.

9. The three-dimensional display method of claim 8, wherein determining display pixel information corresponding to each layer of display unit based on the imaging position in space of the three-dimensional scene and the watching viewpoint position comprises:

performing three-dimensional stereoscopic spatial description on the displayed three-dimensional scene;

tracing a light path from a watching viewpoint through the imaging position of the three-dimensional scene to each layer of display unit to determine corresponding pixel information required to be displayed by each layer of display unit; and traversing all watching viewpoint positions to complete light path tracing to compute all pixel information of each layer of display unit.

10. The three-dimensional display method of claim 8, wherein the array of excitation projection units comprises a single excitation projection unit, and projecting by the excitation projection units in the array of excitation projection units the image sources to corresponding display units in the array of the plurality of layers of display units comprises:

emitting by the single excitation projection unit light with a same wavelength in time sequence to be projected to each layer of display unit in the array of the plurality of layers of display units, or emitting by the single excitation projection unit light with different wavelengths simultaneously to be projected to each layer of display unit in the array of the plurality of layers of display units.

11. The method of claim 8, wherein the array of excitation projection units comprises a plurality of excitation projection units, and projecting by the excitation projection units in the array of excitation projection units the image sources to corresponding display units in the array of the plurality of layers of display units comprises:

emitting by each of the plurality of excitation projection units light with a same wavelength or a different wavelength to be projected to a corresponding display unit in the array of the plurality of layers of display units.

12. An electronic device, comprising:

a display unit configured to perform image display; and a processing unit configured to generate display pixel information based on images to be displayed and to control the display unit to perform corresponding display, wherein the display unit comprises:

an array of a plurality of layers of display units comprising at least two layers of display units, any layer of display unit of the at least two layers of display units being configured with a transparent fluorescent excitation thin film layer; and an array of excitation projection units comprising at least one excitation projection unit, all the projection units in the array of excitation projection units emitting, based on the display pixel information received from the processing unit, light to be projected to corresponding display units in the array of the plurality of layers of display units to excite the transparent fluorescent excitation thin film layer to display corresponding images, the corresponding images being superimposed for imaging, wherein the processing unit determines the imaging position in space of a three-dimensional scene to be displayed, determines the display pixel information corresponding to each layer of display unit based on the imaging position in space of the three-dimensional scene and a watching viewpoint position, and combines the display pixel information into display images to be transferred to corresponding excitation projection units respectively as image sources of projection display.

\* \* \* \* \*